No. 734,785. PATENTED JULY 28, 1903.
E. S. WHEELER.
BATHOMETER OR SHIP'S LOG.
APPLICATION FILED MAR. 17, 1902.
NO MODEL. 2 SHEETS—SHEET 1.
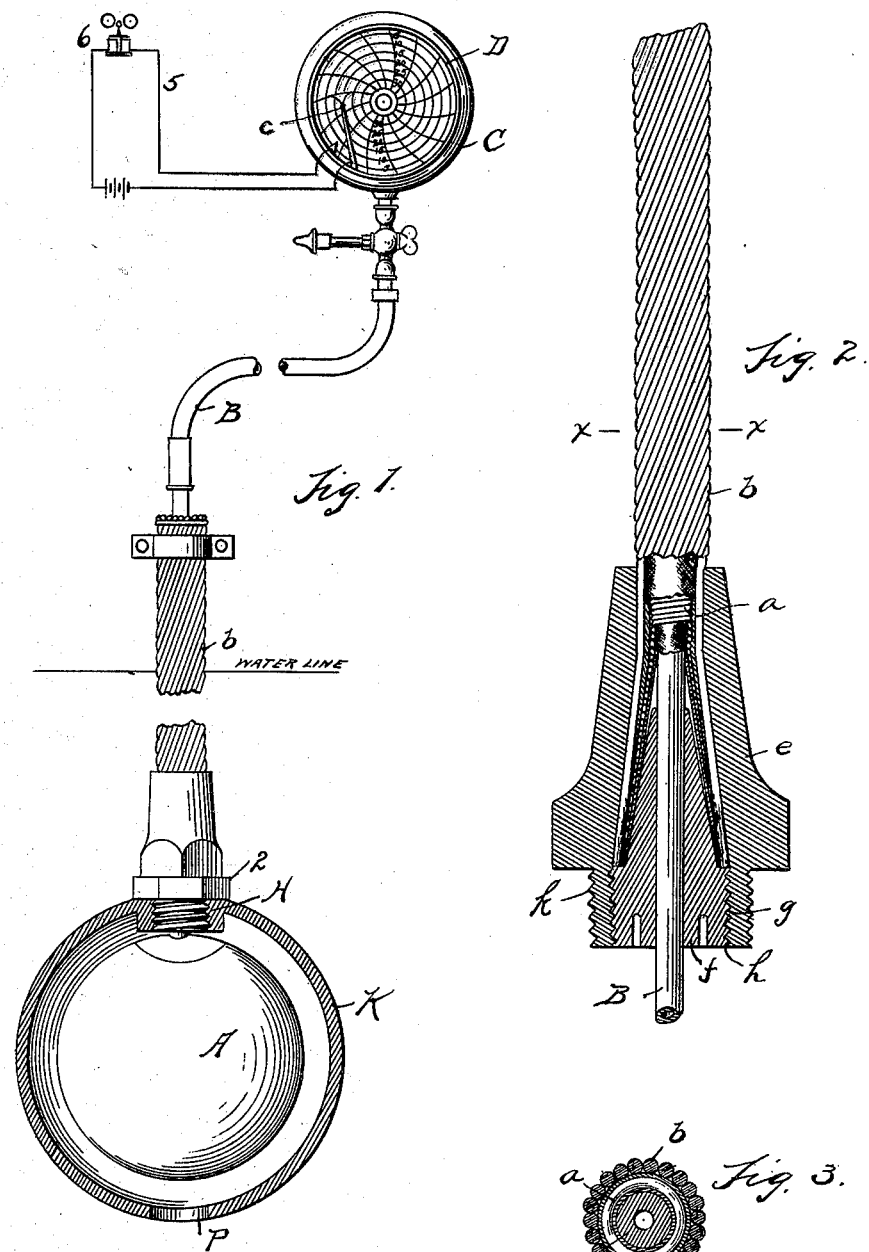
WITNESSES
Chas. E. Wisner
May E. Kott
INVENTOR
Eben S. Wheeler
By Parker + Burton
Attorneys.

No. 734,785. PATENTED JULY 28, 1903.
E. S. WHEELER.
BATHOMETER OR SHIP'S LOG.
APPLICATION FILED MAR. 17, 1902.
NO MODEL. 2 SHEETS—SHEET 2.
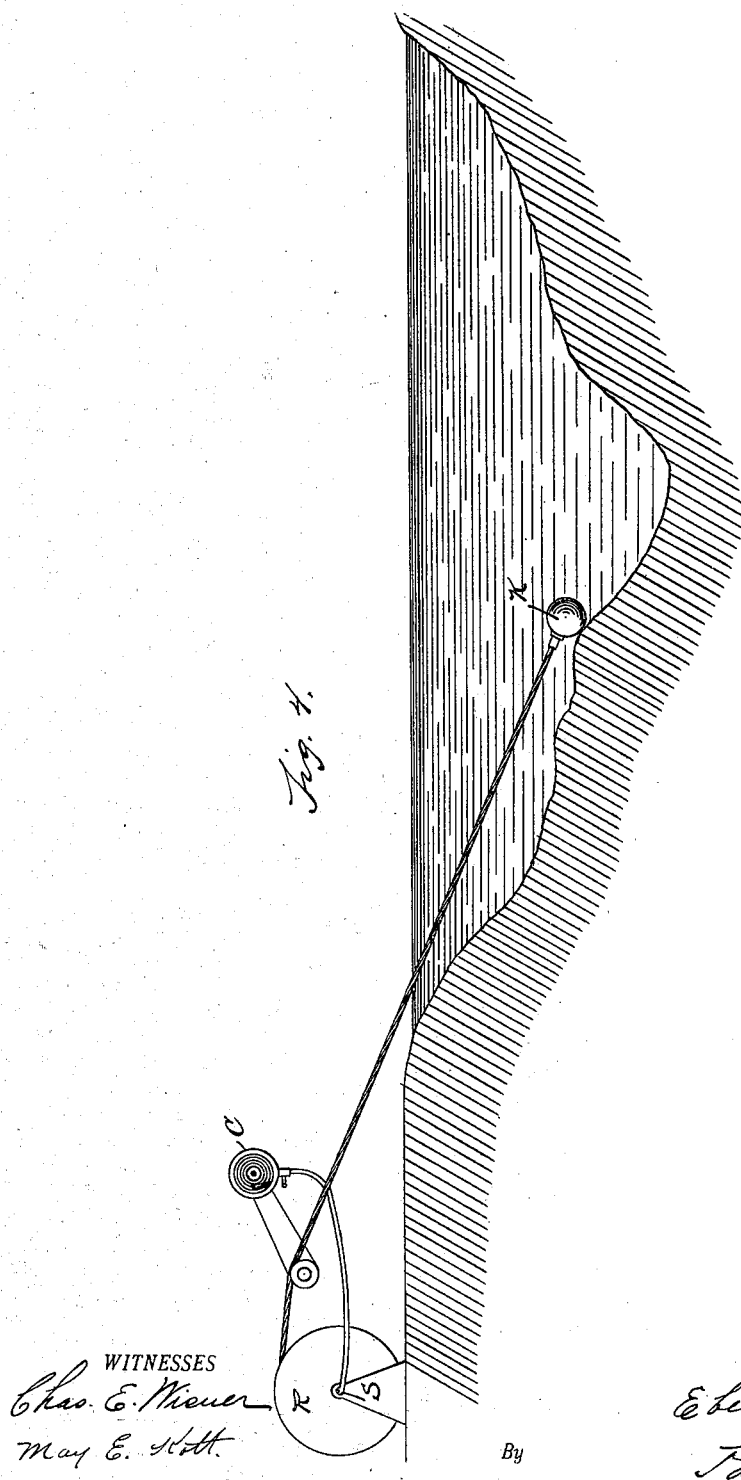

No. 734,785. Patented July 28, 1903.

UNITED STATES PATENT OFFICE.

EBEN S. WHEELER, OF DETROIT, MICHIGAN.

BATHOMETER OR SHIP'S LOG.

SPECIFICATION forming part of Letters Patent No. 734,785, dated July 28, 1903.

Application filed March 17, 1902. Serial No. 98,512. (No model.)

*To all whom it may concern:*

Be it known that I, EBEN S. WHEELER, a citizen of the United States, residing at Detroit, county of Wayne, State of Michigan, have invented a certain new and useful Improvement in Bathometers or Ships' Logs; and I declare the following to be a full, clear, and exact description of the invention, such as will enable others skilled in the art to which it pertains to make and use the same, reference being had to the accompanying drawings, which form a part of this specification.

This invention relates to an apparatus for measuring either the depth of water or the rate of travel of a vessel moving through water. The apparatus is adapted to be used either as a bathometer or as a log.

It consists, essentially, of a flexible air vessel arranged to be submerged and connected by a flexible air-tube with a recording apparatus located above the water; and the invention relates especially to improvements which include the armoring and protecting of the submerged air vessel and the tube which connects it with the recording apparatus and of the combination of the armored tube and air vessel with suitable recording mechanism.

In the drawings, Figure 1 shows the apparatus; and Fig. 2 is an enlarged view of a portion of the armor and tube and shows the terminal of the tube and its armor, so that it may be connected easily and readily and strongly with the air-chamber and its protecting vessel. Fig. 3 is a cross-section at the line $x\ x$ of Fig. 2. Fig. 4 shows the apparatus arranged to describe on a record-sheet contour-lines indicating the surface at the bottom of the water.

A indicates a flexible air-containing vessel—as, for example, a rubber bag.

B indicates a flexible tube connecting the rubber bag A with a bathograph-recording apparatus C D; C being the part which contains the indicating-hand and pencil-carrying hand $c$, and D representing the plate supporting the plotting-paper. It is not thought necessary to show or indicate the clockwork by which the plate D is actuated, as the two parts C and D are parts of well-known registering devices.

The flexible tube B is surrounded by a protecting-armor which comprises, first, a coil of wire $a$, that is wound as a coil of short pitch, the wire being small and the coils being laid as closely as possible together. This coil has been found necessary in the construction of the cable, as without I have found it impossible to overlay the flexible tube with the layer of wire next to be spoken of.

$b$ is the armor, which constitutes a cable and prevents the line from stretching under the strain incident to the use of the apparatus. It comprises a number of strands of steel wire laid closely side by side and wound in coils of long pitch around the inner coil. There is preferably under the coil $a$ and over the tube B a layer of woven textile material, such as woven thread; but this, while desirable, is not essential, and there is over the coil $a$ and between it and the outer coil $b$ a similar textile covering, which is not, however, essential but desirable.

The inner coil of wire $a$, wound with a short pitch wound close, forms a support which prevents the inner coil from collapsing, each coil forming, as it were, a ring that is unyielding as against the inward pressing or contracting strain that would accompany an elongation of the outer strands, and the outer coil $b$ being of a number of strong steel wires wound with very long pitch provides a cable which resists strain to the best advantage. Under strain the outer strands are aided by the inner coils which prevent the contraction in diameter, which must necessarily accompany an elongation of the pitch of the coils. The two coils arranged in this way effectually prevent the contraction which would destroy the tubular form of the flexible rubber tube B and effectually prevent undue elongation of the entire cable. At the lower terminal each strand of the coil B is provided on its end with a coating which enlarges it, preferably made by dipping the end of the wire in melted solder and forming a coating thereon, and the enlarged ends are spaced around the inside of a conical coupling $e$, into which is forced a conical plug $f$. The conical hollow coupling $e$ being provided at its end with an interior thread $g$ and the plug $f$ being provided with a thread $h$, the plug is forced into the coupling, compressing the ends of the wire between the walls of the two pieces and flattened them somewhat and making a strong secure connection between the wires of the cable and the coupling which is fastened onto the end of it. The coupling e is provided with a screw-threaded neck k, that engages in a screw-threaded opening H in a hollow globe K, that surrounds the flexible bag A. The parts are secured by lock-nut 2.

The flexible bag A is itself secured by cement or in any suitable way to the end of the tube B.

I employ a globular guard K for the reason that with a globular guard I obtain results that are more accurate than with any other shape of guard. I am aware that bathographs have been made in which an elastic air-containing vessel placed within a guard and communicating by a flexible tube with a registering apparatus above the water have been used—as, for example, the patent granted to Ericsson, No. 40,028—but in that and in all similar appliances using a flexible tube the tube has not been protected or armored otherwise than by lashing it to a cable, and such protection has given rise to other difficulties, and I am not aware that any tube protected by armor that is at the same time neither compressible nor extensible and which yet retains sufficient flexibility for easy use has ever been employed.

In using this apparatus as a log to determine the speed of a moving vessel it is only necessary to read on the record the depth of the elastic bag, and this always corresponds exactly to the pressure indicated on the bathograph-record—that is, the record shows the depth to which the ball sinks.

The length of the cable, the weight of the guard and cable, and the speed of the vessel are the three factors which are to be considered. The weight and length are constants, and the only variable (the speed) can readily be determined from the variations of the record on the bathograph-paper. The record is permanent and can be referred to and read at any time. Because of the globular form of the guard K the record shows the mean pressure at the center of the ball, and with this shape of ball used as a guard there is no requirement that the reading be corrected for angularity of the guard to line. The indicated reading shows the depth of the center of the ball. If the ball is on the bottom, this is just half the diameter of the ball above the bottom; if used for a log, the center is half the diameter of the ball behind the cable and increases the length of that factor. Were any other shape used it would be necessary to make observations for corrections to be made because of changed position that the center of pressure might assume under different conditions.

By the use of this device a continuous and permanent record may be kept which will show the speed of travel of the vessel throughout the entire duration of its voyage. The record will show speed of travel, duration of stops, and it will also show shoal water that may have been passed through at any time by the vessel. Shoal water will be indicated on such a record by an abnormal lowering of the indicated pressure caused by an abnormal lifting in the water of the compression-chamber. By attaching an electric alarm to the apparatus, as shown at 5 and 6 on Fig. 1, an abnormal lifting of the compression-chamber is indicated at once on board, and this may be set to indicate that the vessel has reached water so shoal as to endanger the vessel.

The apparatus may be used to advantage for making contour-lines of the bottom, for which purpose the recording part of the apparatus is located on the shore or on a fixed vessel, the clockwork-actuator disconnected from the record-carrying plate, the cable and chamber drawn across the space whose contour is to be determined, and the recording apparatus actuated by the cable, in which case the line drawn upon the bathograph bears a relation to the contour over which the compressible vessel is drawn. It may have the same contour or it may be multiplied in either direction according to the connection made between the record-paper and the cable by which the apparatus is drawn. By the use of this apparatus accurate hydrographic surveys may be made in the way described.

In using the apparatus for the purpose last described it is preferable to draw the cable and wind it on a reel R, which has a hollow axle S, with which the tube of the cable communicates, and to the end of the hollow axle is a tube connection swiveled thereto, which is at its other end connected to and arranged to actuate the recorder.

The spherical shell K is provided with a perforation P for the free access of water to its interior.

What I claim is—

1. In a bathometer, in combination a flexible chamber, a fluid-actuated recording apparatus, a flexible tube connecting the recording apparatus and the chamber, a protective covering on the flexible tube, a protective shell secured to the covering and inclosing the flexible chamber, substantially as described.

2. The combination of an armored tube, a flexible chamber at the end thereof, a recording apparatus connected through said tube with the flexible chamber, a shell adapted to protect said flexible chamber, said shell being connected to the armor of said tube.

3. In a bathometer, the combination of a flexible tube with a pressure-recording instrument connected thereto at one end and with a chamber adapted to vary with pressure secured to the other end thereof, a protective covering for said tube, and a protective covering for said chamber, the two protective coverings being secured together, substantially as described.

4. The combination of an armored tube, a spherical shell at the end thereof held by the armor, a flexible chamber within the shell and a recording apparatus having communication therewith through said tube, substantially as described.

In testimony whereof I sign this specification in the presence of two witnesses.

E. S. WHEELER.

Witnesses:
H. R. ALLEN,
MAY E. KOTT.